United States Patent
Flanders

(10) Patent No.: US 6,373,644 B1
(45) Date of Patent: Apr. 16, 2002

(54) MICRO OPTICAL BENCH COMPONENT CLIP STRUCTURES

(75) Inventor: Dale C. Flanders, Lexington, MA (US)

(73) Assignee: Axsun Technologies, Inc., Billerica, MA (US)

(*) Notice: Subject to any disclaimer, the term of this patent is extended or adjusted under 35 U.S.C. 154(b) by 0 days.

(21) Appl. No.: 09/708,762

(22) Filed: Nov. 8, 2000

Related U.S. Application Data

(60) Provisional application No. 60/165,431, filed on Nov. 15, 1999.

(51) Int. Cl.[7] .................................................. G02B 7/02
(52) U.S. Cl. ...................................................... 359/822
(58) Field of Search ................................ 359/811, 819, 359/822, 821

(56) References Cited

U.S. PATENT DOCUMENTS 3,652,152 A * 3/1972 Thursby, Jr. ................ 359/822
4,993,809 A * 2/1991 Leib et al. .................... 359/19

FOREIGN PATENT DOCUMENTS

GB          2133901 A  *  8/1994
JP     2000195083 A  *  7/2000

OTHER PUBLICATIONS

IBM Technical Disclosure Bulletin, NN8207702, Purgless Sample Chamber for IRFT Spectrometers, Jul. 1982.*
Grade, D. John; Jerman, Hal, "A Large–Deflection Electrostatic Actuator for Optical Switching Applications," Solid–State Sensor and Actuator Workshop, Hilton Head Island, South Carolina, Jun. 4–8, 2000.

* cited by examiner

Primary Examiner—Ricky Mack
(74) Attorney, Agent, or Firm—J. Grant Houston

(57) ABSTRACT

A structure that is compatible with passive alignment, and is capable of integration onto a micro-optical bench system, provides for the secure attachment of optical components to the bench. The structure comprises a base and a clip structure for an optical component that is formed in the base. The clip structure can be etched into bulk material of the base. In one implementation, the clip structure is created using reactive ion etching in silicon or silicon-on-insulator (SOI) wafer material. In the preferred embodiment, the clip comprises an alignment wall and a resilient arm. The resilient arm engages a first side of the optical component to urge a second side of the optical component into engagement with the alignment wall. This cooperation between the arm and the alignment wall allows for precise registration of the optical component against the alignment wall to scales attainable with semiconductor lithography.

26 Claims, 5 Drawing Sheets

MICRO OPTICAL BENCH COMPONENT CLIP STRUCTURES

RELATED APPLICATION

This application claims the benefit of the filing date of U.S. Provisional Application No. 60/165,431, filed Nov. 15, 1999, the teachings of which are incorporated herein by this reference in their entirety.

BACKGROUND OF THE INVENTION

One of the primary technical challenges associated with the manufacture of optical systems, and especially systems offering higher levels of integration, is component alignment. This thesis is especially applicable in free-space-interconnect optical systems where optical components, such as active device (e.g., semiconductor lasers), passive devices (e.g., filters), and/or MOEMS (micro-optical electromechanical systems) (e.g., tunable filters and switches) are integrated together on a common submount or micro-optical bench. Scales characteristic of such optical components can necessitate sub-ten micrometer to sub-micrometer alignment accuracy.

There are two general classes of alignment strategies: active and passive. Typically, in passive alignment of the optical components, registration or alignment features are fabricated directly on the components as well as on the platform to which the components are to be mounted. The components are then mounted and bonded directly to the platform using the alignment features. In active alignment, an optical signal is transmitted through the components and detected, sometimes after an initial passive alignment of the components. The alignment is performed based on the transmission characteristics to en able the highest possible performance level for the system.

SUMMARY OF THE INVENTION

Generally, optical system manufacturing systems seek to improve the speed at which the optical systems can be manufactured using passive alignment. In the ideal case, the optical systems can be manufactured using all passive alignment strategies, but even if an all-passive alignment approach is not possible requiring a subsequent active alignment "tuning or optimization step", the precision of the passive alignment is critical to minimizing the time required in the final active alignment.

The present invention concerns a structure that is compatible with passive alignment. Specifically, an alignment system is described that is capable of integration onto a micro-optical bench system, provides for the secure attachment of optical components to the bench, and yields component installation in a known and reproducible fashion.

In general, according to one aspect, the invention concerns an optical bench system. The system comprises a base and a clip structure for an optical component that is formed in the base.

According to the preferred embodiment, the clip structure is etched into bulk material of the base. In one implementation, the clip structure is created using reactive ion etching in silicon or silicon-on-insulator (SOI) wafer material. Alternatively, other material systems, such as those based on III-V material systems can be used along with other anisotropic etching techniques such as those based on crystallographic orientation. Further, electroforming techniques can be used such as those provided by the LIGA process.

In the preferred embodiment, the clip comprises an alignment wall and a resilient arm. The resilient arm engages a first side of the optical component to urge a second side of the optical component into engagement with the alignment wall. This cooperation between the arm and the alignment wall allows for precise registration of the optical component against the alignment wall and a secure engagement to yield alignment accuracies equivalent to that attainable with semiconductor lithography processes.

In order to ease installation of the optical component into the structure, an insertion channel may further be provided. Specifically, the optical component is inserted into the base or bench via the insertion channel and then slide into engagement between the resilient arm and the alignment wall. Specifically, a wall of the insertion channel smoothly transitions into the alignment wall. An opposed side of the insertion channel is formed by a base region of the arm.

In order to provide for further registration of the optical component in the clip structure, cooperating bench and component registration features are preferably provided. Typically, a bench registration feature engages a component registration feature to locate the optical component in a longitudinal direction to the clip structure.

Further, vertical registration features can be provided between the optical component and the bench to register the optical component in a vertical direction relative to the plane of the bench. In one embodiment, a projecting stub is provided on the optical component that engages the bench when the optical component has been fully inserted into the clip structure.

One further feature is to provided an electrode and trace on the optical bench, which the stub engages to provide for electrical connection to the optical component. A permanent mechanical connection between the stub and the electrode can be provided by a subsequent solder reflow step.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
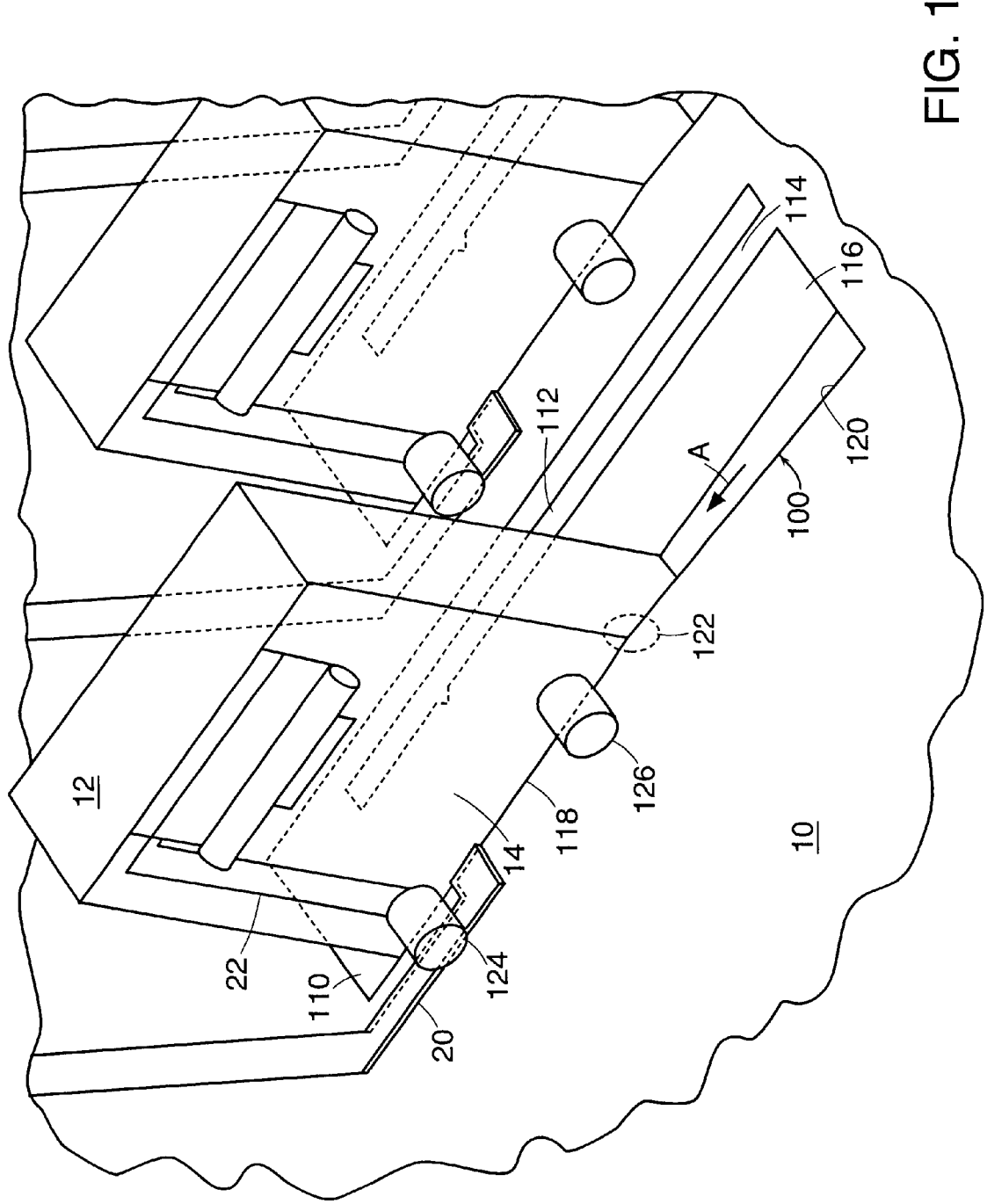
FIG. 1 is a perspective view of a clip structure for an optical bench system holding a MOEMS device, according to the present invention.

FIG. 1 shows a clip structure for an optical bench system, which has been constructed according to the principles of the present invention.

Specifically, a MOEMS device 12 is installed on an optical bench 10, or more generally a base. In the specific illustrated example, the MOEMS device 12 is a roller shade optical switch as described in U.S. Pat. No. 5,784,189. This MOEMS switch device, however, is shown merely for the purposes of illustrating the invention. The invention is compatible with other MOEMS switches besides the illustrated roller shade switch, and other types of MOEMS devices such as tunable filters, e.g. Fabry-Perot tunable filters. Moreover, in still other implementations, passive optical components such as dichroic filters or active devices, such as semiconductor lasers, are aligned on the optical bench using the clip structure 100 of the present invention.

The clip structure 100 generally comprises a blind hole 110, which has been etched or otherwise formed in the bulk material of the optical bench 10.

In one implementation, the optical bench 10 is manufactured from silicon. This can either be standard silicon wafer material or a silicon-on-insulator (SOI) composite material. In this later implementation, the buried oxide is used as an etch stop layer/sacrificial release layer. In still other embodiments, silicon metal composite or silicon nitride benches are used.

Moreover, the present invention is not limited to only the use of silicon as bulk material. For example, in other implementations, the bulk material of the bench 10 is a III-V material such as GaAs (gallium arsenide).

According to standard semiconductor fabrication techniques, the blind hole 110 is preferably etched into the bulk material of the base 10. Such high aspect ratio features are preferably manufactured using deep reactive ion etching (RIE). In alternative embodiments, other anisotropic etch techniques are used such as those based on the crystallography. For example, potassium hydroxide can be used to anisotropically etch 100 silicon in an aqueous etch process.

In still further embodiments, the clip structures of the bench are fabricated using the LIGA process, using metal or metal alloys such as nickel, gold, and alloys of nickel and gold, for example.

Although, in some aspects of the present invention, the depth of the blind hole is not critical, process control is achieved, in some embodiments, if an etch stop layer is used in the bulk material of the base. This etch stop layer can be the insulation layer in the SOI system or other etch stop systems, such as ion-implanted or doped layers.

According to the present invention, the clip structure 100 comprises an alignment wall 118 and a resilient arm 112. Specifically, the optical component 12 is held such that a proximal side of optical component is pressed into engagement with the alignment wall 118 by the resilient arm 112 engaging a distal side of the optical component 12.

According to a preferred embodiment, the clip structure 100 further comprises an insertion channel 116. This is provided because of the difficulty associated with biasing the resilient arm 112 away from the alignment wall 118 during the insertion of the optical component 12. As a result, the insertion channel 116 allows for the insertion for the optical component into the clip structure 100 at the insertion channel. The optical component 12 is then slid in the direction of arrow A such that it is held between the alignment wall 118 and the distal end of the resilient arm 112.

This slide insertion of the optical component 12 is facilitated by a proximal end of a wall 120 of the insertion channel forming an oblique angle with respect to a plane of the alignment wall 118. Preferably, there is a smooth transition between the insertion channel wall 120 and the alignment wall 118 as generally indicated by region 122.

According to the preferred embodiment, the optical bench system further comprises a vertical registration system. Specifically, in the illustrated implementation, it comprises two stubs 124, 126 projecting from the proximal face 14 of the optical component 12, in the illustrated embodiment. These stubs 124, 126 engage a top surface of the bench 10 to define the full insertion of the optical component 12 into the blind hole 110 of the clip feature 100.

In the implementation where the optical component 12 is an electrically controlled MOEMS, such as the illustrated roller shade switch, at least one of the alignment stubs 124 preferably makes contact with an electrode 20 of the bench 10 as illustrated. The electrode provides electrical current or potential to the stub 124, which then drives or controls the MOEMS optical device 12 via conductive traces 22, which are formed on the optical component 12.

In one embodiment, the vertical registration system is also used to permanently secure the optical component 12 in the clip 100. Specifically, either the electrode 20 or the stub 124, or both, are coated with solder or a solder perform in placed between the electrode 20 and the stub 126 prior to installation. A subsequent solder reflow step yields a permanent electrical and mechanical connection between the component 12 and the bench 10. In fact, solder surface tension in the reflow process can be used to fully seat the component in the bench clip.

Figure 2A:
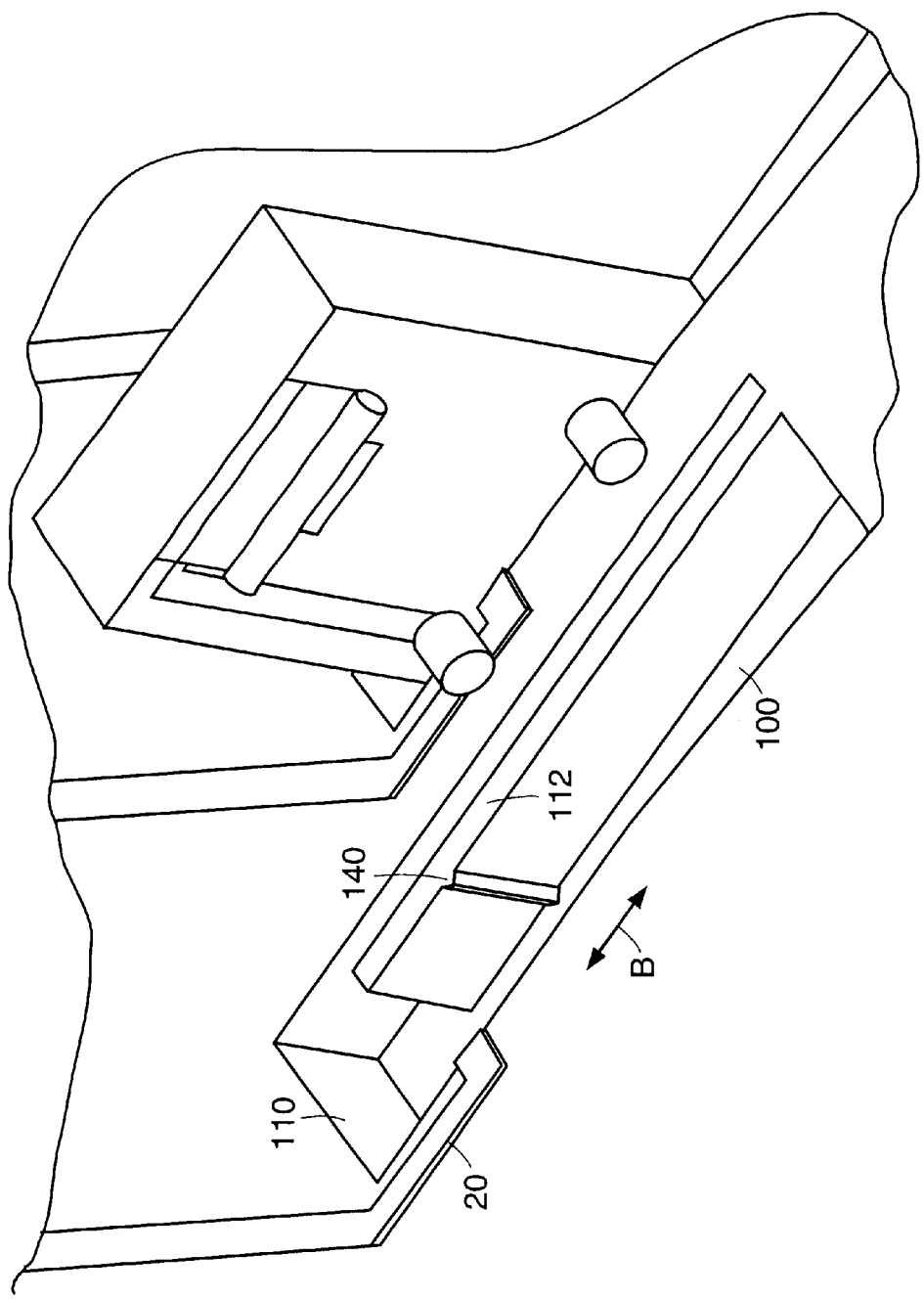
FIG. 2A is a perspective view of the inventive clip structure with the MOEMS device removed.
Figure 2B:
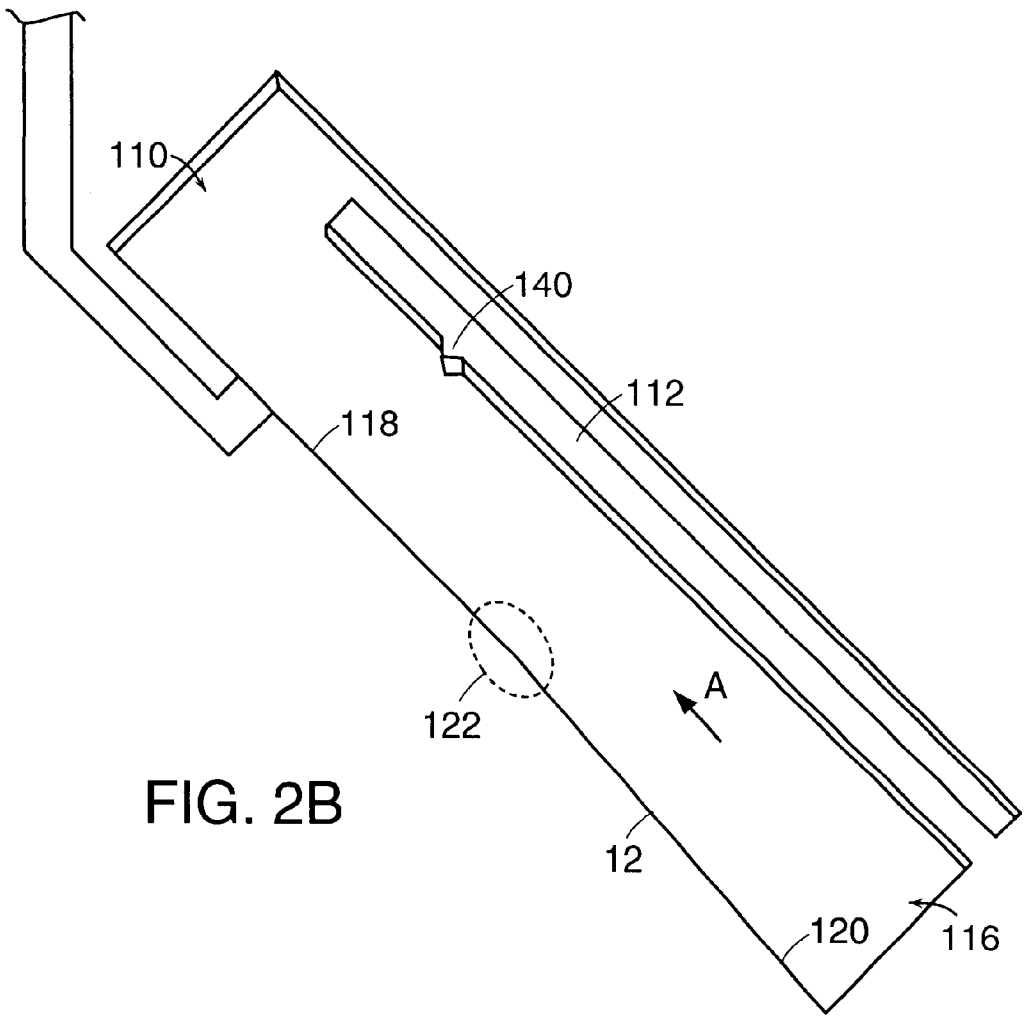
FIG. 2B is another perspective top view of the inventive clip structure.

FIGS. 2A and 2B show the clip structure 100 with the optical component 12 removed.

FIG. 2A further illustrates a registration feature 140. It is used to passively locate the optical component along the longitudinal direction of the clip structure 100. See arrow B of the blind hole 110 of the clip feature 100.

FIG. 2B illustrates the configuration of the proximal wall of the insertion slot 116 sloping obliquely away from the alignment wall 118 of the clip feature. Specifically, the smooth transition in the region of 122 allows an optical component to be first inserted into the blind hole 110 at the insertion slot 116 and then slide in the direction of allow A to move into engagement between the arm 112 and the alignment wall 118.

Figure 3:
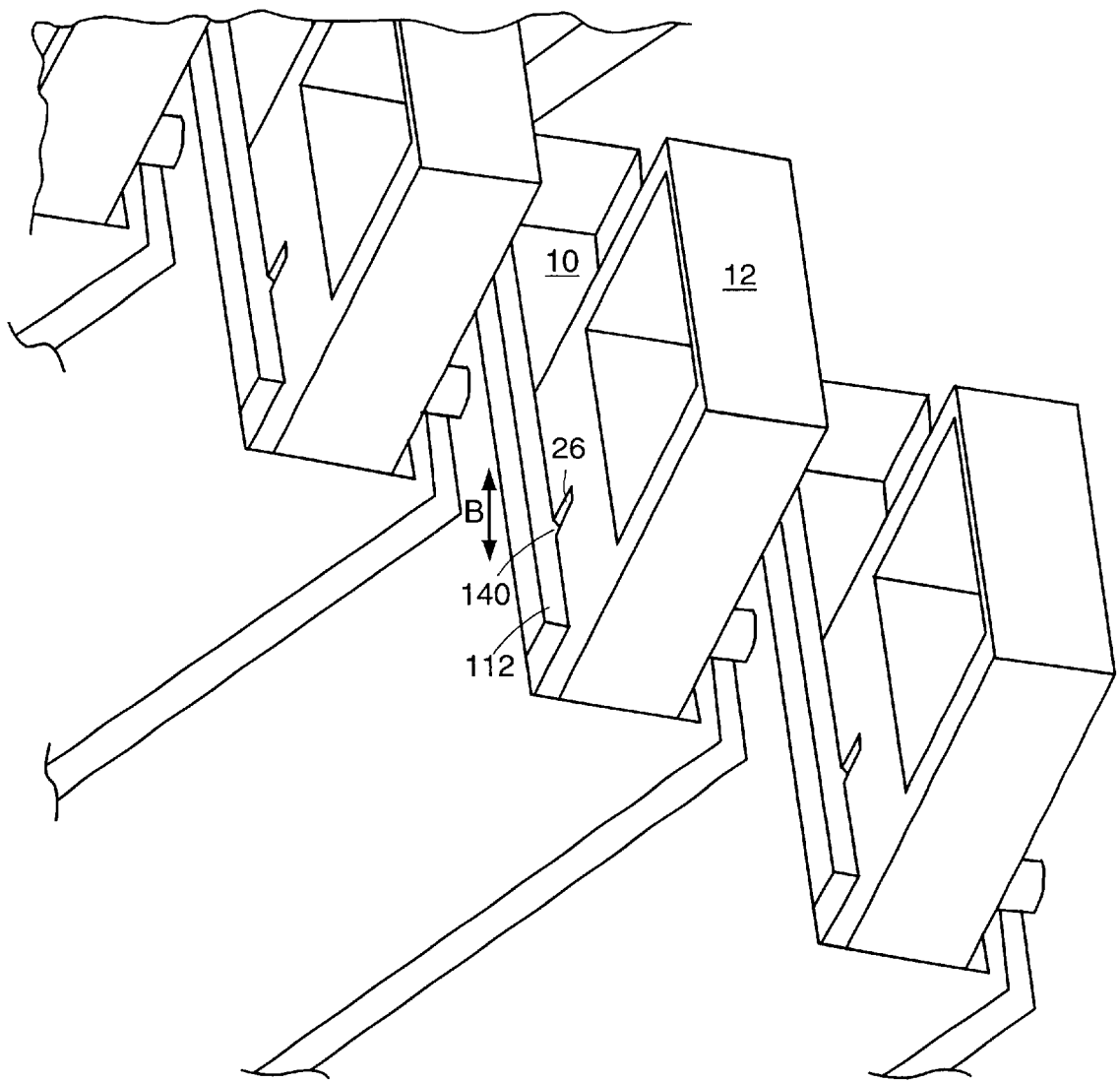
FIG. 3 is a perspective, reverse angle view showing the engagement between the clip structure and the optical component according to the present invention.

FIG. 3 is a reverse angle view illustrating the engagement between the bench registration feature 140 and a component registration feature 26. Specifically, in the illustrated embodiment, the bench registration feature comprises a generally V-shaped projection on the arm 112. When the optical component 12 has been inserted to a predetermined location in the blind hole 110 along axial direction B, the bench alignment feature 140 engages the optical component alignment feature 26. In the illustrated embodiment, the optical component alignment feature 26 comprises a slot having V-cross section.

Figure 4:
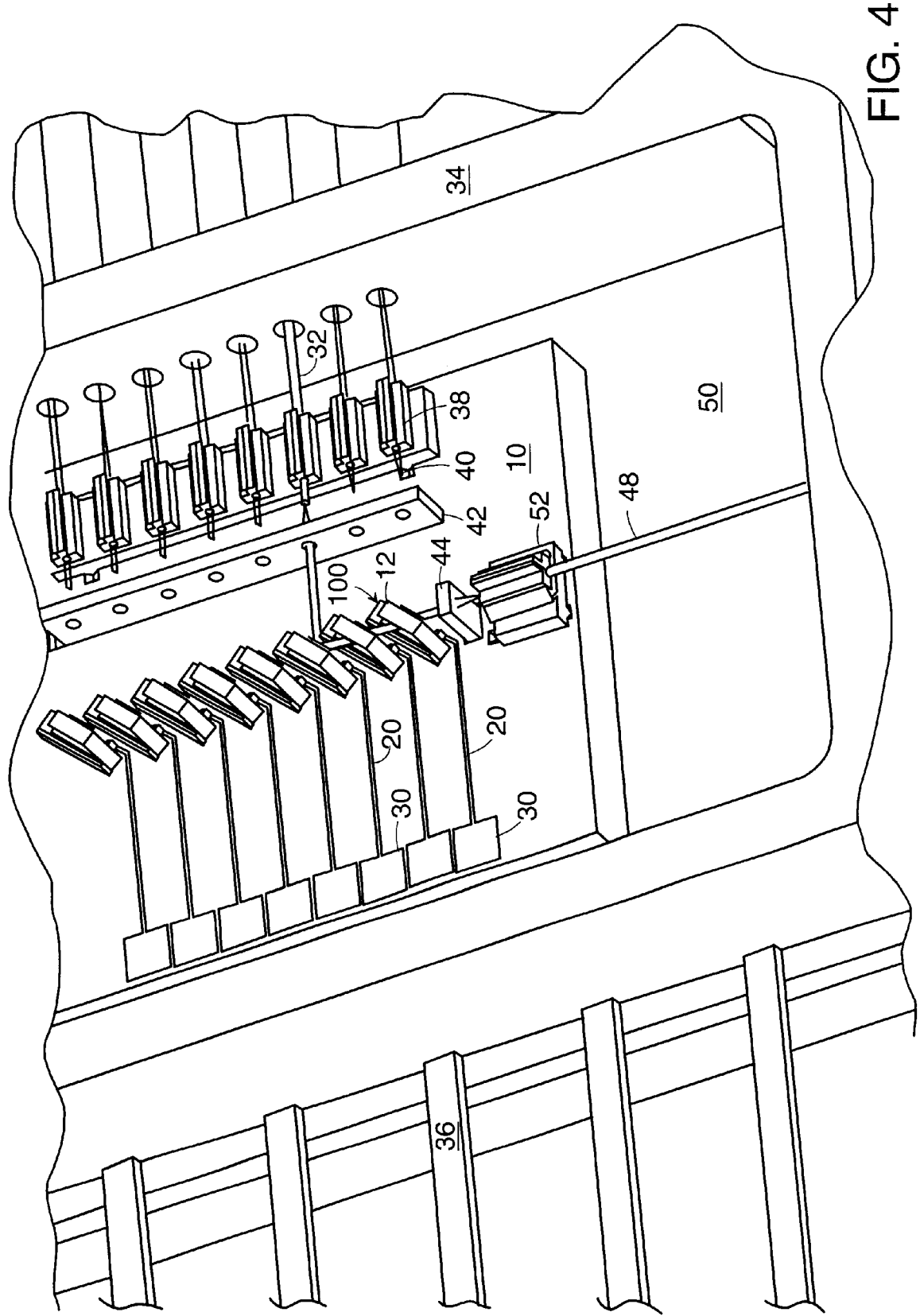
FIG. 4 is a perspective view showing the integration of multiple MOEMS devices using the clip structures, according to the present invention, into an optical system.

FIG. 4 shows the integration of the optical bench alignment system into an optical system. Specifically, optical fibers 32 enter a hermetic package through a sidewall (in the view the package lid has been removed). They are held down onto the optical bench 10 via fiber mounting structures 38. These mounting structures are collectively attached to the bench 10, but allow for the individual alignment of the separately held optical fibers 32 relative to system optical interconnect. Light from the optical fibers is collimated by an array of collimating lenses 42 and is directed to an array of roller shade MOEMS devices 12. Each of these roller shade devices is held in a clip structure 100 as described previously. They selectively reflect one of the beams to be coupled into the output fiber 48, which is held in a mounting structure 52, which is also attached to the bench 10.

As also described previously, each one of these separate MOEMS devices 12 is separately actuated. Specifically, the bench electrical traces 20 provide electrical conductivity between bond pads 30 and the individual MOEMS devices 12. These bond pads are used for wire bonding between the side leads 36 of the hermetic package 34 and these bond pads.

Of course, in an alternative implementation, optical signals can be provided on fiber 48 as an input signal and separately directed to one of the fibers 32, functioning as output fibers.

While this invention has been particularly shown and described with references to preferred embodiments thereof, it will be understood by those skilled in the art that various changes in form and details may be made therein without departing from the scope of the invention encompassed by the appended claims.

What is claimed is:

1. An optical bench system, comprising:
   a base; and
   a clip structure for an optical component, the clip structure being formed in the base, wherein the clip structure comprises an alignment wall and a resilient arm.

2. An optical bench system as claimed in claim 1, wherein the clip structure is etched into bulk material of the base.

3. An optical bench system as claimed in claim 2, wherein the bulk material is silicon.

4. An optical bench system as claimed in claim 2, wherein the bulk material is SOI.

5. An optical bench system as claimed in claim 2, wherein the bulk material is a III-V material.

6. An optical bench system as claimed in claim 1, wherein the clip structure is etched into bulk material of the base using reactive ion etching.

7. An optical bench system as claimed in claim 6, wherein the bulk material comprises a silicon on insulator composite material, the reactive ion etching being performed to a depth of an insulator layer.

8. An optical bench system as claimed in claim 7, wherein the insulator layer is silicon oxide.

9. An optical bench system as claimed in claim 1, wherein the clip structure is formed from a metal or metal alloy.

10. An optical bench system as claimed in claim 1, wherein the clip structure is electroformed.

11. An optical bench system as claimed in claim 1, further comprising an insertion channel having clearance for receiving the optical component.

12. An optical bench system. as claimed in claim 1, further comprising an insertion channel having clearance for receiving the optical component; upon the insertion, the optical component being slid into engagement between the resilient arm and the alignment wall.

13. An optical bench system as claimed in claim 12, wherein a wall of the insertion channel smoothly transitions into the alignment wall.

14. An optical bench system as claimed in claim 12, wherein a plane of the wall of the insertion channel extents in a direction oblique to a plane of the alignment wall and/or resilient arm.

15. An optical bench system as claimed in claim 12, wherein another wall of the insertion channel is formed by a base portion of the resilient arm.

16. An optical bench system as claimed in claim 1, wherein at least one of the alignment wall or the resilient arm comprise a bench registration feature for engaging a component registration feature of the optical component.

17. An optical bench system as claimed in claim 16, wherein the bench registration feature engages the component registration feature to locate the optical component at a predetermined position in the clip.

18. An optical bench system as claimed in claim 16, wherein the bench registration feature comprises a projection on the resilient arm.

19. An optical bench system as claimed in claim 18, wherein the projection has a v-shaped cross-section.

20. An optical bench system as claimed in claim 18, wherein the component registration feature comprises a depression.

21. An optical bench system, comprising:
    a base; and
    a clip structure for an optical component, the clip structure being formed in the base, wherein the optical component further comprises a vertical registration feature for engaging the base such that the optical component has a predetermined elevation relative to the base upon installation in the clip.

22. An optical bench system as claimed in claim 21, wherein the vertical registration feature comprises a stub projecting from the optical component.

23. An optical bench system ,as claimed in claim 21, wherein the vertical registration feature engages an electrode on the base upon installation of the optical component in the clip, the electrode supplying an electrical signal to the optical component.

24. An optical bench system as claimed in claim 23, wherein the vertical registration feature is attached to the electrode in a solder reflow process.

25. An optical bench system as claimed in claim 23, further comprising an electrical trace formed on the base between the electrode and a bond pad.

26. An optical bench system, comprising:
    a base; and
    a clip structure for an optical component, the clip structure being formed in the base, wherein the clip structure comprises an alignment wall and a resilient arm, wherein the resilient arm engages a first side of the optical component and urges a second side of the optical component into engagement with the alignment wall.

* * * * *